US008578067B2

(12) United States Patent
Diab

(10) Patent No.: US 8,578,067 B2
(45) Date of Patent: Nov. 5, 2013

(54) METHOD AND SYSTEM FOR DETERMINING CHARACTERISTICS OF AN ATTACHED ETHERNET CONNECTOR AND/OR CABLE

(75) Inventor: Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 28 days.

(21) Appl. No.: 12/731,933

(22) Filed: Mar. 25, 2010

(65) Prior Publication Data

US 2011/0219147 A1    Sep. 8, 2011

Related U.S. Application Data

(60) Provisional application No. 61/309,603, filed on Mar. 2, 2010.

(51) Int. Cl.
*G06F 3/00* (2006.01)
*H01R 13/66* (2006.01)

(52) U.S. Cl.
USPC ........................................ 710/15; 439/620.01

(58) Field of Classification Search
None
See application file for complete search history.

(56) References Cited

U.S. PATENT DOCUMENTS

| 7,766,692 | B2 * | 8/2010 | Johnsen et al. ............... 439/488 |
| 8,353,458 | B2 * | 1/2013 | Nobutani ..................... 235/492 |
| 2002/0023245 | A1 * | 2/2002 | Tokudome .................... 714/751 |
| 2011/0115494 | A1 * | 5/2011 | Taylor et al. ................. 324/537 |

* cited by examiner

*Primary Examiner* — Idriss N Alrobaye
*Assistant Examiner* — Richard B Franklin
(74) *Attorney, Agent, or Firm* — Brinks Hofer Gilson & Lione

(57) ABSTRACT

A connector comprising a storage device that stores configuration information, may be coupled to a twisted pair cable and may communicate the configuration information to a host device via a corresponding connector. The configuration information may comprise characteristics, features and/or configurations of the connector and/or the cable, for example, wire gauge, safety information, cable category, verification of testing, inner shielding, outer shielding, no shielding, type of use, and/or country of manufacture. The storage device may comprise an EPROM. The configuration information may be communicated utilizing one or more configured pins. The corresponding connector may sense and/or read the configuration information from the connector. The corresponding connector may be mechanically ganged and/or communicatively coupled to other connectors that are integrated in the host device. A single controller may control acquisition of configuration information. A data rate for communicating via the connector and/or cable may be determined based on the configuration information.

19 Claims, 7 Drawing Sheets

METHOD AND SYSTEM FOR DETERMINING CHARACTERISTICS OF AN ATTACHED ETHERNET CONNECTOR AND/OR CABLE

CROSS-REFERENCE TO RELATED APPLICATIONS/INCORPORATION BY REFERENCE

This application makes reference to and claims priority to U.S. Provisional Application Ser. No. 61/309,603, filed on Mar. 2, 2010, entitled "Method and System For Determining Characteristics Of An Attached Ethernet Connector And/Or Cable," which is incorporated herein by reference in its entirety.

This application also makes reference to:
U.S. patent application Ser. No. 12/701,381 which was filed on Feb. 5, 2010;
U.S. patent application Ser. No. 12/840,683 which was filed on Jul. 21, 2010;
U.S. patent application Ser. No. 12/731,908 which was filed on Mar. 25, 2010;
U.S. patent application Ser. No. 12/853,945 which was filed on Aug. 10, 2010;
U.S. patent application Ser. No. 12/752,065 which was filed on Mar. 31, 2010;
U.S. patent application Ser. No. 12/785,102 which was filed on May. 21, 2010; and
U.S. patent application Ser. No. 12/702,173 which was filed on Feb. 8, 2010.

Each of the above stated applications is hereby incorporated herein by reference in its entirety.

FIELD OF THE INVENTION

Certain embodiments of the invention relate to communication systems. More specifically, certain embodiments of the invention relate to determining characteristics of an attached Ethernet connector and/or cable.

BACKGROUND OF THE INVENTION

Communication devices may incorporate a plurality of features, for example, a mobile phone, a digital camera, an Internet browser, a gaming device, a Bluetooth headphone interface and/or a location device. In this regard, the communication devices may be operable to communicate via a plurality of wire-line and/or wireless networks such as local area networks, wide area networks, wireless local area networks, cellular networks and wireless personal area networks, for example. In this regard, endpoint devices may communicate via various wireless and/or wire-line switches, routers, hubs, access points and/or base stations.

Many communication devices may communicate via twisted pair cables which may comprise pairs of copper wire that are twisted together. Various numbers of twists or turns in the wire pairs may enable mitigation of common mode electromagnetic interference. Twisted pair cabling may be shielded and/or unshielded. Shielding may comprise a conductive material that may enable grounding of the cable. A grounding wire may be also be utilized for grounding twisted pair cabling. The shielding may enclose a single pair of twisted wires and/or may enclose a plurality of pairs. The shielding may comprise foil and/or a braided sheath, for example. In this regard, the shielding may mitigate cross talk between twisted pairs and/or between a plurality of cables. Various characteristics of a cable, for example, wire gauge, safety information, category, verification of testing, inner shielding, outer shielding, no shielding, type of use, such as patch cord, and/or country of manufacture may be imprinted on the cable jacket during manufacture.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method determining characteristics of an attached Ethernet connector and/or cable.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for determining characteristics of an attached Ethernet connector and/or cable. A connector may comprise a storage device and may acquire configuration information for the connector from the storage device. The acquired configuration information may be communicated to a host device to which the connector may be communicatively coupled, via a corresponding connector. The connector may also be communicatively coupled to a twisted pair cable. The configuration information may comprise one or more of characteristics, features and/or configurations of the connector and/or of a cable that is communicatively coupled to the connector. Moreover, the configuration information may comprise a wire gauge, safety information, cable category, verification of testing, inner shielding, outer shielding, no shielding, type of use, and/or country of manufacture. The storage device may comprise an EPROM or other type of memory. The connector may indicate the configuration information of the connector utilizing one or more configured pins within the connector. The corresponding connector may sense and/or read the configuration information from the connector. The corresponding connector may be integrated in the host device and may be mechanically ganged and/or communicatively coupled to one or more other connectors that are integrated in the host device. A single controller that may be integrated in the host device may control the acquisition of the configuration information from the storage device in the connector. A data rate for communicating data via the connector and/or via a cable that is communicatively coupled to the connector, may be determined based on the configuration information. In this manner, data may be communicated via the connector and/or via the cable, based on one or more characteristics, features and/or configurations that may be stored and/or configured within the connector.

Figure 1A:
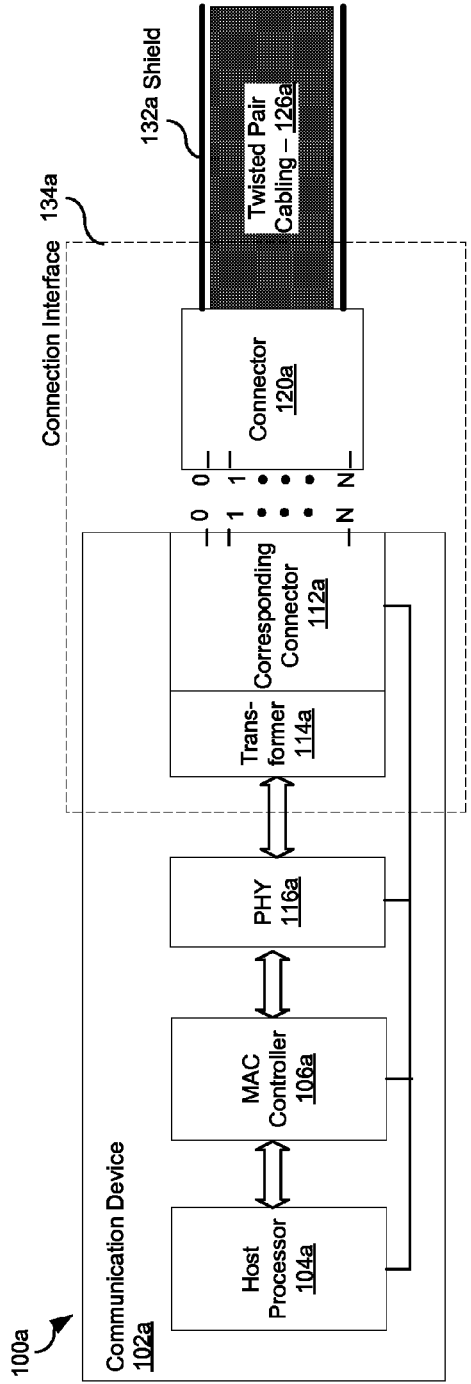
FIG. 1a is a block diagram illustrating an exemplary communication device with a connection interface that is operable to determine cable characteristics that are stored on an attached connector, in accordance with an embodiment of the invention.

FIG. 1a is a block diagram illustrating an exemplary communication device with a connection interface that is operable to determine cable characteristics that are stored on an attached connector, in accordance with an embodiment of the invention. Referring for FIG. 1a, there is shown a communication system 100a comprising a communication device 102a and a connection interface 134a. The communication device 102a may comprise a host 104a, a MAC controller 106a, a PHY 116a and a corresponding connector 112a. The connection interface 134a may comprise the corresponding connector 112a comprising a transformer 114a, a connector 120a, a cable 126a and an optional shield 132a.

The communication device 102a may comprise suitable logic, circuitry, interfaces and/or code that may be operable to communicate with other communication devices via the connection interface 134a. An exemplary embodiment of the communication device 102a may comprise a router, a switch, a patch panel, a laptop, a portable phone, a media player, a location device, a television, a set-top-box, a camera and/or a gaming device. The communication device 102a may be operable to communicate via the connection interface 134a based on a plurality of different standardized and/or non-standardized communication protocols and/or communication technologies. For example, the communication device 102a may communicate based on various Ethernet protocols.

The host 104a may comprise suitable logic, circuitry, interfaces and/or code that may be operable to control one or more aspects of communication via the connection interface 134a. The host 104a may be communicatively coupled with the MAC controller 106a for communication of data and/or control information. Furthermore, the host 104a may be operable to communicate with the connection interface 134a to determine various characteristics, features and/or configurations of the connector 120a and/or the cable 126a. In this regard, the cable 126a may comprise the optional shield 132a which may be regarded as a characteristic of the cable 126a. The various characteristics, features and/or configurations of the connector 120a and/or the cable 126a may be referred to as characteristics, for example. The various characteristics of the connector 120a and/or the cable 126a may be stored and/or configured on the connector 120a and may be communicated via the corresponding connector 112a to the host 104a.

In an exemplary embodiment of the invention, the connector 120a may be operable to communicate one or more connector and/or cable characteristics, features and/or configurations that may comprise, wire gauge, safety information, category of cable and/or connector, verification of testing, inner shielding, outer shielding, no shielding, type of use of the connector and/or cable, such as patch cord, and country of manufacture of the connector 120a and/or the cable 126a. Notwithstanding, the invention is not limited with regard to any specific information that may be communicated by the connector 120a and any suitable information may be communicated. In various embodiments of the invention, one or more of the various characteristics of the connector 120a and/or the cable 126a may be read by the communication device 102a via the connection interface 134a and may be displayed and/or communicated to another device. Furthermore, the communication device 102a may read the various connector and/or cable characteristics and/or may utilize the various characteristics to determine a data rate for communicating via the connector 120a and/or the cable 126a. Moreover, the communication device 102a may perform autonegotiation based on the various connector 120a and/or cable 126a characteristics.

The MAC controller 106a may comprise suitable logic, circuitry, interfaces and/or code that may be operable to handle data link layer, OSI layer 2, operability and/or functionality in the communication device 102a. In various embodiments of the invention, the MAC controller 106a may be configured to implement Ethernet protocols, such as those based on the IEEE 802.3 standard, for example. The MAC controller 106a may be operable to communicate with the host 104a and/or the PHY device 116a.

The PHY device 116a may be operable to communicate in an upstream and/or a downstream direction at various data rates, for example, <10 Mbps, 10 Mbps, 100 Mbps, 1000 Mbps (or 1 Gbps), 10 Gbps, 40 Gbps, and/or other data rates, for example. In this regard, the PHY device 116a may support standards-based data rates and/or non-standard data rates via the connector 120a and/or the cable 126a. The PHY device 116a may be configured to handle all the physical layer requirements, which may comprise, for example, packetization, data transfer and serialization/deserialization (SERDES), in instances where such an operation is required. In various embodiments of the invention, the PHY device 116a may be operable to read various connector 120a and/or cable 126a characteristics via the corresponding connector 112a. The PHY device 116a shown in FIG. 116a may be integrated within the communication device 102. This aspect of the FIG. 1A comprises a primary distinction between the FIG. 1A and the FIG. 1B. In this regard, the PHY device shown in FIG. 1B, 116b, may be integrated on the corresponding connector 112b.

The connection interface 134a may be configurable to support communication based on a plurality of standardized and/or non-standardized communication protocols and/or technologies. In various embodiments of the invention, the connection interface 134a may comprise the corresponding connector 112a that may be referred to as the jack 112a. In addition, the connection interface 134a may comprise the connector 120a, the cable 126a and/or the optional shield 132a. The optional shield 132a may be referred to as a characteristic, configuration and/or feature of the cable 126a and/or the connection interface 134a. The corresponding connector 112a may be operable to communicate via connectors and/or cables comprising various characteristics. Moreover, the connection interface 134a may comply with one or more cabling standards, for example, ISO/IEC and/or TIA standards. When the connector 120a and the cable 126a are coupled to the corresponding connector 112a, the corresponding connector 112a may be operable to identify the various connector 120a and/or cable 126a characteristics. In this regard, voltage for enabling identification of the various connector 120a and/or cable 126a characteristics may be supplied to the connection interface 134a in any suitable manner. For example, voltage may come from the host 104a, from a power source located within the connection interface 134a and/or from power over Ethernet (PoE). Furthermore, a capacitor within the connection interface 134 may charge and/or discharge when the connector 120a is coupled to the corresponding connector 112a in order to provide enough power to identify the various connector 120a and/or cable 126a characteristics.

The connection interface 134a may comply with standardized and/or non-standard specifications. For example, the corresponding connector 112a and the connector 120a may comprise Ethernet connectors. In various embodiments of the invention, the corresponding connector 112a, the connector 120a and/or the cable 126a may be small enough to fit into a handheld device and/or small enough to enable greater than 48 jacks and/or connectors to fit into a one rack unit face plate. Furthermore, in various embodiments of the invention, the connection interface 134a may comprise a plurality of corresponding connectors such as the corresponding connector 112a that may be ganged together. In this regard, the connection interface 134a may be modular. Moreover, in various embodiments of the invention, the connection interface 134a may be operable to support power over Ethernet.

The connection interface 134a may comprise suitable logic, circuitry, interfaces and/or code that may enable the connection interface 134a to be auto-sensed and/or identified. The connection interface 134a may be configurable. For example, the corresponding connector 112a and/or the connector 120a may be populated or depopulated with various modules, or optional features and/or may be configurable, for example, by loading software or firmware and/or setting hardware, for example, during manufacturing, installation and/or operation of the connection interface 134a. Various aspects of the invention may enable detection and/or identification of the connector 120a, the cable 126a and/or various features, configurations and/or characteristics thereof, for example, as manufactured. U.S. patent application Ser. No. 12/853,945 filed on Aug. 10, 2010, which is incorporated herein by reference in its entirety, may comprise additional information regarding such a connection interface and/or cable.

The corresponding connector 112a may comprise suitable logic, circuitry, interfaces and/or code that may be operable to read characteristics of the connector 120a and/or the cable 126a and/or may be operable to communicate via the connector 120a and/or the cable 126a based on the characteristics. In various embodiments of the invention, the corresponding connector 112a may be operable to terminate a cable and/or connector comprising a twisted pair cable, for example, the connector 120a and/or the cable 126a. In this regard, the corresponding connector 112a may be utilized for various functions, for example, for service and/or management of the communication device 102a and/or for data communication. Furthermore, the corresponding connector 112a may be configurable for wireless communication, for example, the corresponding connector 112a may function as an antenna port. The corresponding connector 112a may be multifunctional where a plurality of types of communication may operate concurrently or sequentially. In this regard, the connector 120a may comprise an access point and/or antenna circuitry. U.S. patent application Ser. No. 12/785,102, filed on May 21, 2010, which is incorporated herein by reference in its entirety, may comprise additional information regarding a connection interface comprising wireless and/or wire-line capability.

The connector 120a may be coupled to the cable 126a and/or to the optional shield 132a. The connector 120a may be operable to connect to the corresponding connector 112a and may be utilized for communication between the communication device 102a and a link partner. In various embodiments of the invention, the connector 120a may comprise suitable logic, circuitry, interfaces and/or code that may be operable to communicate based on IEEE 802.3 standards and/or extensions and/or variations thereof. Furthermore, the connector 120a may comprise suitable logic, circuitry, interfaces and/or code that may be operable to identify and/or communicate various characteristics, features and/or configurations of the connector 120a and/or the cable 126a. In this regard, the connector 120a and/or the cable 126a may be configurable, for example, during manufacture and/or by a user of the connection interface 134a. For example, the corresponding connector 112a and/or the connector 120a may be populated or depopulated with various modules or optional features and/or may be configurable, for example, by loading software or firmware and/or setting hardware. Various aspects of the invention may enable the communication device 102a to detect and/or identify various features, configurations and/or characteristics of the connector 120a and/or the cable 126a. For example, pins on the connector 120a and/or for example, an EEPROM on the connector 120a may be configured to communicate the various features, configurations and/or characteristics. The pins and/or EEPROMs are described with respect to FIG. 2, FIG. 3, FIG. 4, FIG. 5 and FIG. 6

The cable 126a may comprise a copper medium, for example, the cable 126a may comprise pairs of insulated twisted wires. The number of pairs within the cable 126a as well as other factors, such as shielding, the length of the cable and/or wire gauge may be utilized to determine which protocols and/or which data rates the cable 126a may be operable to support. In various embodiments of the invention, the cable 126a may comprise the optional shield 132a. The optional shield 132a may comprise, for example, foil and/or a braided sheath around and/or along a length of one or more twisted pairs. For example, one or more individual twisted pairs may be shielded and/or all and/or a plurality of twisted pairs may be shielded together by the optional shield 132a. The optional shield 132a may be grounded by the communication device 102a via the corresponding connector 112a, for example.

In operation, when the connector 120a is coupled to the corresponding connector 112a, the corresponding connector 112a and/or the communication device 102a may be operable to detect and/or read various characteristics, features and/or configurations of the connector 120a and/or the cable 126a. In this regard, the various characteristics, features and/or configurations of the connector 120, the cable 126a and/or the connection interface 134a may be referred to as the various characteristics. In an exemplary embodiment of the invention, the communication device 102a may be operable to enable pins in the connector 120a to supply a current or signal that may indicate the various characteristics via the corresponding connector 112a. In another exemplary embodiment, the communication device 102a may be operable to enable and/or read from a module integrated on the connector 120a, for example, an EEPROM or EPROM, that may comprise information about the connector 112a and/or the cable 126a. For example, a user of the communication device 102a may query the communication device 102a and/or the connection interface 134a for information such as what is the category of the cable 126a and/or the connector 120a. In another example, the host 104a may query the connection interface 134a for the category and/or other various characteristics, features and/or configurations of the connector 120a and/or the cable 126a to determine an appropriate data rate for communicating via the connection interface 134a. Furthermore, the host 104 may perform autonegotiation with a link partner that may be coupled via the connector 112a and/or the cable 126a in accordance with the various characteristics of the connection interface 134a.

Figure 1B:
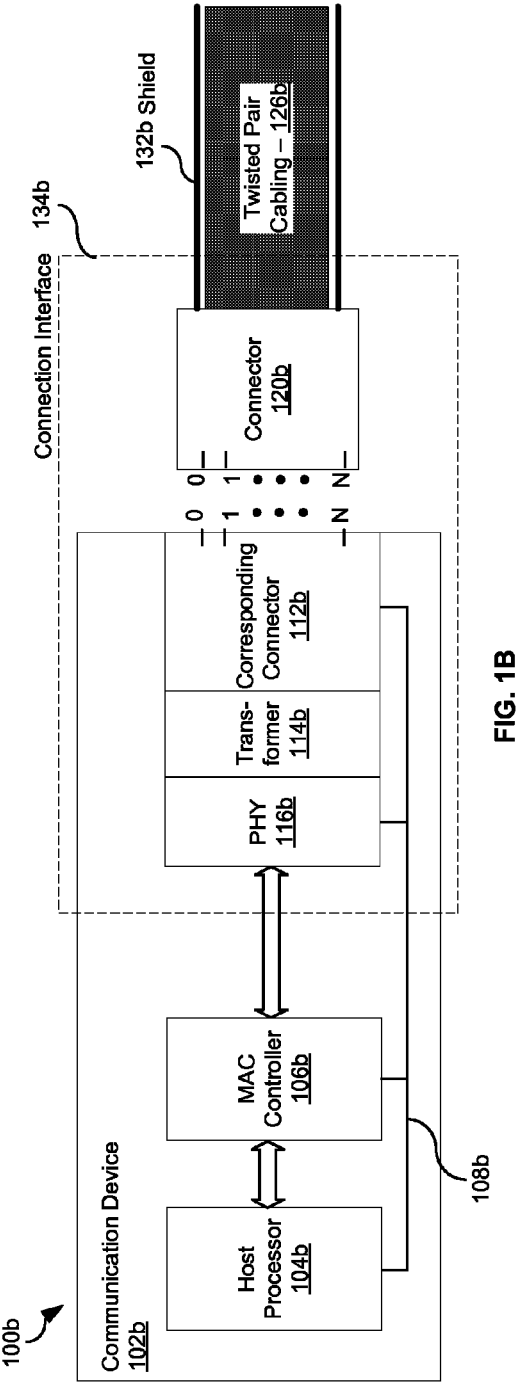
FIG. 1b is a block diagram illustrating an exemplary connection interface comprising an integrated PHY that is operable to determine cable characteristics that are stored on an attached connector, in accordance with an embodiment of the invention.

FIG. 1b is a block diagram illustrating an exemplary connection interface comprising an integrated PHY that is operable to determine cable characteristics that are stored on an attached connector, in accordance with an embodiment of the invention. Referring for FIG. 1b, there is shown a communication system 100b comprising a communication device 102b and a connection interface 134b. The communication device 102b may comprise a host 104b, a MAC controller 106b, a bus 108b and a corresponding connector 112b. The connection interface 134b may comprise the corresponding connector 112b which may comprise a transformer 114b and a PHY device 116b, a connector 120b, a cable 126b and an optional shield 132b.

Various aspects of the communication system 100b may be similar and/or substantially the same as the communication system 100a. In this regard, the primary difference in the communication systems 100a and 100b comprises the placement of a PHY device. The PHY device 116a of the communications system 100a may be integrated within the communication device 102a, for example, on a circuit board that may comprise the host 104a. In contrast, the PHY device 116b of the communication system 100b may be integrated on the connector 112b. By integrating the PHY device 116b within the corresponding connector 112b, rather then some distance from the corresponding connector on circuit board within the coupled communication device 102b, various traces, and/or circuitry may be simplified and/or may offloaded from the circuit board.

In other embodiments of the invention, the MAC controller 106b, or MAC functions, may be integrated in the corresponding connector 112b and/or in the connector 120b. Accordingly, the MAC or MAC functions in the corresponding connector 112b may handle media access and thus multiple connectors, each enabled to communicate data, may replace a single legacy connector. That is, multiple corresponding connectors 112b that comprise a MAC controller, may fit into the solder land pattern of the legacy connector and the number of ports on the communication device 102b may be increased by replacing the single legacy connector with a plurality of corresponding connectors 112b.

In various embodiments of the invention, suitable logic, circuitry, interfaces, and/or code operable to implement one or more network management protocols such as simple network management protocol (SNMP), link layer discovery protocol (LLDP), and data center bridging exchange (DCBX) may reside on and/or within the corresponding connector 112b. In this regard, packets in accordance with one or more network management protocols may be generated and/or parsed or deconstructed in the corresponding connector 112b. That is, one or more network management protocols may be terminated in the corresponding connector 112b. In this manner, various components of the corresponding connector 112b, the connector 120b and/or other portions of the networking enabled device 102b may be configured and/or otherwise managed based on management information received over a network. For example, one or more LLDP packets may be received and processed in the corresponding connector 112b and the corresponding connector may be configured and or controlled based on information received in the LLDP packet(s). Similarly, information recovered from one or more LLDP packet may be conveyed to the host 104b via the bus 108b. In various embodiments of the invention, LLDP packets may convey characteristics of the connector 120b and/or the cable 126b to the host 104b via the bus 108b.

U.S. patent application Ser. No. 12/702,173, filed on Feb. 8, 2010, which is incorporated herein by reference in its entirety, may comprise additional information regarding a connector interface comprising an integrated PHY. Other aspects and/or operations of the communication system 100b may be similar and/or substantially the same as that of the communication system 100a as described with respect to FIG. 1a. The connection interfaces shown in the figures FIG. 2, FIG. 3, FIG. 4, FIG. 5, FIG. 6 and/or described in FIG. 7 may or may not comprise a PHY device and/or a MAC controller integrated within connectors and/or within corresponding connectors as shown in FIG. 1B.

Figure 2:
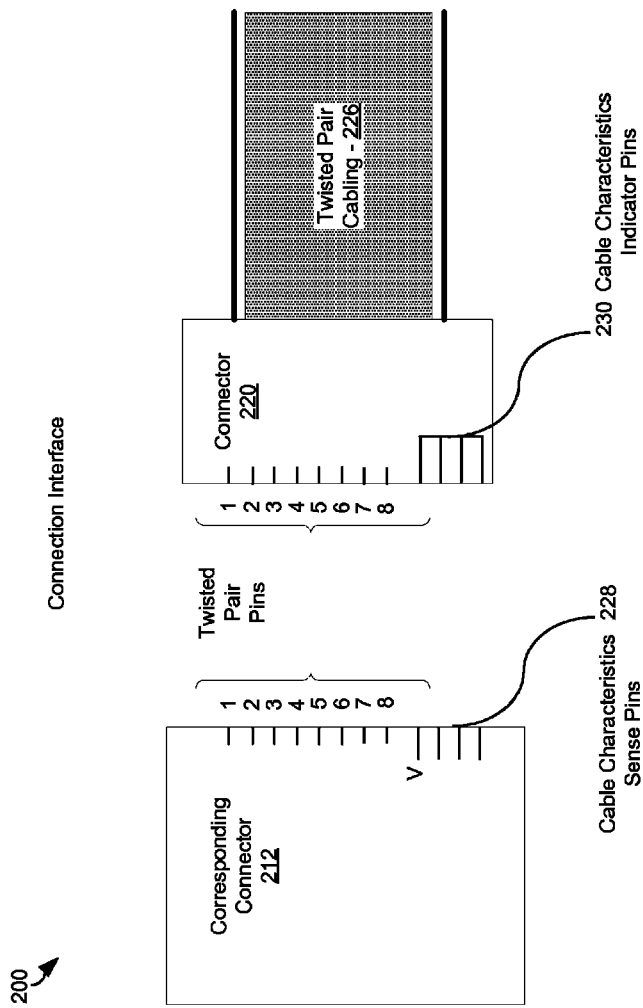
FIG. 2 is a block diagram illustrating an exemplary connection interface that is operable to determine various cable characteristics based on continuity tests of configurable pins, in accordance with an embodiment of the invention.

FIG. 2 is a block diagram illustrating an exemplary connection interface that is operable to determine various cable characteristics based on continuity tests of configurable pins, in accordance with an embodiment of the invention. Referring to FIG. 2, there is shown a connection interface 200 that may comprise a corresponding connector 212, a connector 220, a cable 226, sense pins 228 and indicator pins 230.

Various aspects of the connection interface 200 may be similar and/or substantially the same as the connection interface described with respect to FIG. 1a and/or as the connection interface described with respect to FIG. 1b, for example. The connection interface 200 may be attached to and/or communicatively coupled to a communication device, for example, the communication device 102a and/or 102b. The connection interface 200 may comprise the corresponding connector 212, the connector 220 and/or the cable 226. Various aspects of the corresponding connector 212, the connector 220 and/or the cable 226 may be similar and/or substantially the same as the corresponding connector 112a, the connector 120a and/or the cable 226a respectively, for example. Moreover, various aspects of the corresponding connector 212, the connector 220 and/or the cable 226 may be similar and/or substantially the same as corresponding aspects of the corresponding connector 112b, the connector 120b and/or the cable 226b respectively, for example.

The corresponding connector 212 may comprise suitable logic, circuitry, interfaces and/or code that may be operable to receive an indicator signal and/or current from the connector 220 that may indicate various characteristics of the connector 220 and/or the cable 226. In various embodiments of the invention, the corresponding connector 212 may be operable to deliver a voltage to one or more indicator pins 230 within the connector 220. The corresponding connector 212 may comprise one or more sense pins 228 that may receive feedback, for example, the indicator signal and/or current from the indicator pins 230 in the connector 220. The feedback may indicate how the connector 220 and/or cable 226 are configured, which features they may comprise and/or various characteristics of the connector 220 and/or cable 226. The voltage may be provided to the corresponding connector 212 in any suitable manner. For example, the voltage may come from the host 104a or 104b, from a power source located within the connection interface 234 and/or from power over Ethernet (PoE). Furthermore, a capacitor within the corresponding connector 212 and/or within the connector 220 may charge and/or discharge when the connector 220 is coupled to the corresponding connector 212 and the capacitor may deliver power for the indicator signal and/or current.

The connector 220 may comprise suitable logic, circuitry, interfaces and/or code that may be operable to communicate the various characteristics of the connector 220 and/or the cable 226. In this regard, one or more indicator pins 230 may be configured to provide a signal and/or current to the corresponding connector 212. The indicator pins 230 may be configured, for example, during a manufacturing process and/or by a user. In various embodiments of the invention, the indicator pins 230 may be configured by shorting one or more pins and/or closing one or more circuits to a voltage level. In some instances, a pin or combination of pins may correspond to one or more specified connector and/or cable characteristics, features and/or configurations, although the invention is not limited with regard to how the pins are configured.

In operation, the connector 220 may comprise one or more indicator pins 230 that may be configured to represent one or more characteristics, features and/or configurations of the connector 220 and/or the cable 226. The corresponding connector 212 may comprise the sense pins 228. In instances when the connector 220 is attached to the corresponding connector 212, the indicator pins 230 may be coupled to the sense pins 228. A voltage may be delivered to the indicator pins 230, for example, via the sense pins 230. The indicator pins 230 may return to the corresponding connector 212 via the sense pins 228, one or more signals and/or currents that may indicate the one or more characteristics, features and/or configurations of the connector 220 and/or the cable 226.

Figure 3:
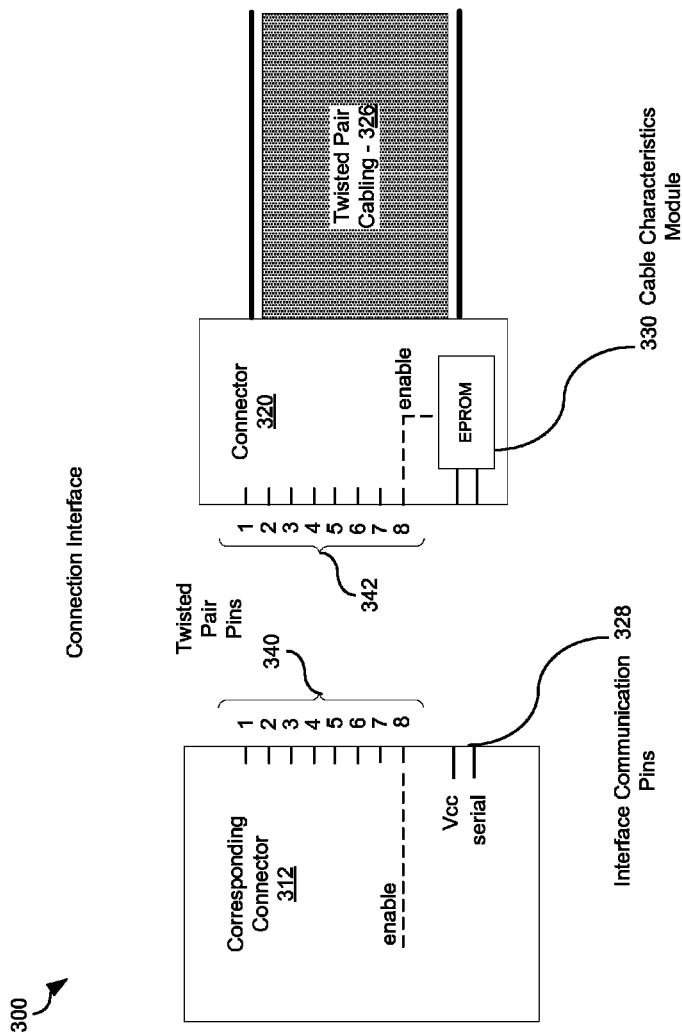
FIG. 3 is a block diagram that illustrates an exemplary connector that may comprise a module for storing and/or identifying various cable characteristics, in accordance with an embodiment of the invention.

FIG. 3 is a block diagram that illustrates an exemplary connector that may comprise a module for storing and/or identifying various cable characteristics, in accordance with an embodiment of the invention. Referring to FIG. 3, there is shown the connection interface 300 and the corresponding connector 312 that may comprise the interface communication pins 328 and the twisted pair terminal pins 340. In addition, there is shown the cable 326 and the connector 320 that may comprise the cable characteristics module 330 and the twisted pair pins 342.

Various aspects of the connection interface 300 may be similar and/or substantially the same as the connection interface 134a described with respect to FIG. 1a and/or as the connection interface 134b described with respect to FIG. 1b, for example. The connection interface 300 may be attached to and/or communicatively coupled to a communication device, for example, the communication device 102a and/or 102b. The connection interface 300 may comprise the corresponding connector 312, the connector 320 and/or the cable 326. Various aspects of the corresponding connector 312, the connector 320 and/or the cable 326 may be similar and/or substantially the same as various corresponding aspects of the corresponding connector 112a, the connector 120a and/or the cable 126a respectively, for example. Moreover, various aspects of the corresponding connector 312, the connector 320 and/or the cable 326 may be similar and/or substantially the same as corresponding aspects of the corresponding connector 112b, the connector 120b and/or the cable 126b respectively, for example.

The corresponding connector 312 may comprise suitable logic, circuitry, interfaces and/or code that may be operable to read information from the connector 320 that may indicate various characteristics, features and/or configuration of the connector 320 and/or the cable 326. The corresponding connector 312 may comprise a plurality of twisted pair terminal pins 340 and/or a plurality of interface communication pins 328. The plurality of twisted pair terminal pins 340 may be operable to couple to the twisted pair pins 342 in the connector 320 and/or the cable 326. Furthermore, the plurality of interface communication pins 328 may couple to the cable characteristics module 330 in the connector 320 and may be operable to receive information from cable characteristics module 330 regarding various characteristics, features and/or configuration of the connector 320 and/or the cable 326. In an exemplary embodiment of the invention, the corresponding connector 312 may comprise two interface communication pins 328 for communicating with the cable characteristics module 330, for example, a Vcc pin and/or a serial communication pin. Furthermore, in various embodiments of the invention, a third interface communication pin 328 may provide an enable signal to the cable characteristics module 330; however, the invention is not so limited.

A voltage may be provided to the corresponding connector 312 and/or the connector 320 in any suitable manner. For example, the voltage may come from the host 104a or 104b and/or the communication device 102a and/or 102b, from a power source located within the connection interface 334, from PoE and/or from a capacitor within the corresponding connector 312 and/or within the connector 320 as described with respect to FIG. 2. In various embodiments of the invention, the corresponding connector 312 may be operable to deliver a voltage to the cable characteristics module 330 within the connector 320 via the interface communication pins 328, for example, when the connector 320 is coupled to the corresponding connector 312.

In various embodiments of the invention, the corresponding connector 312 may be operable to provide a signal that may enable the cable characteristics module 330 to communicate various connector and/or cable characteristics via the interface communication pins 328. For example, the host 104a and/or the host 104b may request and/or initiate an enable signal to be sent to the cable characteristics module 330 in order to read various cable characteristics that may be stored in the module 330. The enable signal may be generated and/or communicated to the cable characteristics module in any suitable manner. For example, a PHY device, such as the PHY device 116a and/or 116b may generate an enable signal and may communicate the signal to the cable characteristics module 330 via one or more of the twisted pair terminal pins 340 in the corresponding connector 312 and the twisted pair pins 342 in the connector 320. Notwithstanding, the invention is not so limited. For example, in another embodiment of the invention, an enable signal may be sent to the cable characteristics module 330 via the interface communication pins 328. In this regard, one or more interface communication pins 328 may be dedicated to providing an enable signal to the cable characteristics module 330.

The connector 320 may comprise suitable logic, circuitry, interfaces and/or code that may be operable to store and/or communicate the various characteristics, features and/or configuration of the connector 320 and/or the cable 326 to the corresponding connector 312. The connector 320 may comprise a plurality of twisted pair pins 342. In addition, the connector 320 may comprise the cable characteristics module 330. In this regard, cable characteristics module 330 may be configured to provide a signal, for example, a serial signal to the corresponding connector 312.

The cable characteristics module 330 may comprise suitable logic, circuitry, interfaces and/or code that may be operable to store various characteristics, features and/or configuration of the connector 320 and/or the cable 326. In an exemplary embodiment of the invention, the cable characteristics module 330 may comprise an EEPROM, for example.

In this regard, various cable 326 and/or connector 320 characteristics, features and/or configurations may be stored within the cable characteristics module 330, for example, during a manufacturing process, by a user and/or by the communication device 102a and/or 102b. For example, the communication device 102a and/or 102b may be attached to the connection interface 300. The communication device 102a and/or 102b may be operable to run diagnostic tests on the connector 320 and/or the cable 326 and may write the results to the cable characteristics module 330.

In operation, the connector 320 may comprise a cable characteristics module 330 that may comprise an EEPROM, for example. Various characteristics, features and/or configurations of the connector 320 and/or the cable 326 may be stored in the cable characteristics module 330. The connector 320 may be coupled to the corresponding connector 312 that may be attached to the communication device 102b, for example. At the time of connector-in, a voltage and/or an enable signal may be delivered to the connector 320 and/or to the cable characteristics module 330. For example, the host 104b may generate an enable signal and may communicate the enable signal to the cable characteristics module 330 via an interface communication pin 328 that may be coupled to the cable characteristics module 330. The cable characteristics module 330 may write various characteristics, features and/or configurations of the connector 320 and/or the cable 326 to the communication device 102b via the connection interface pins 328 in the corresponding connector 312. In other exemplary embodiments of the invention, the enable signal may be delivered to the cable characteristics module 326 via a twisted pair terminal pin 340 and/or a twisted pair pin 242 in the connector 320. The communication device 102b may be operable to determine a communication data rate and/or to perform autonegotiation based on the various cable 326 characteristics, features and/or configurations.

Figure 4:
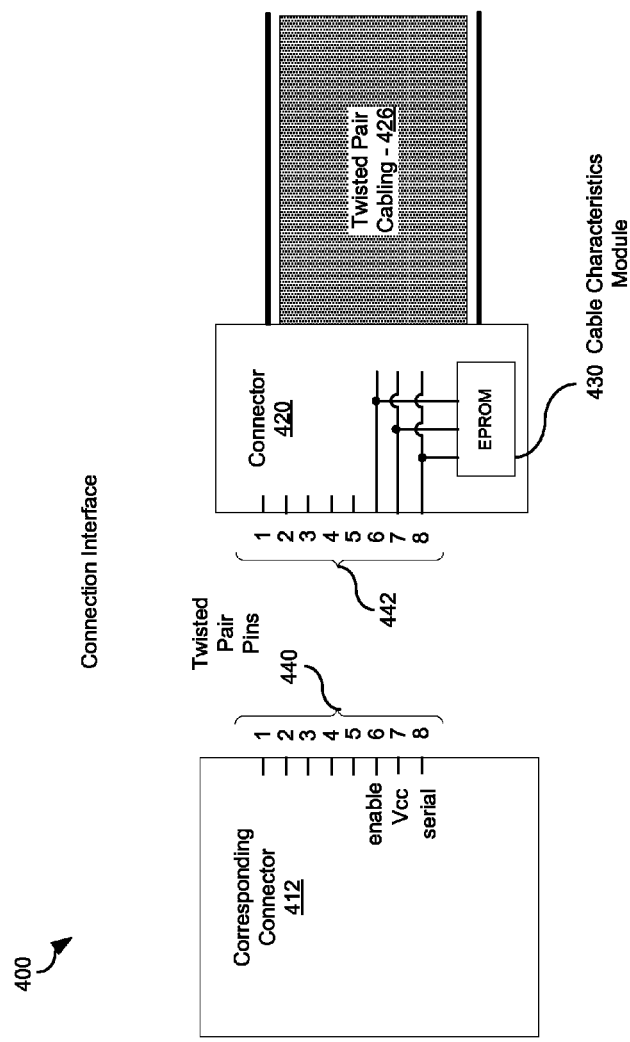
FIG. 4 is a block diagram illustrating an exemplary connection interface comprising a module for storing and/or identifying various cable characteristics that may be read utilizing twisted pair wires and/or corresponding pins, in accordance with an embodiment of the invention.

FIG. 4 is a block diagram illustrating an exemplary connection interface comprising a module for storing and/or identifying various cable characteristics that may be read utilizing twisted pair wires and/or corresponding pins, in accordance with an embodiment of the invention. Referring to FIG. 4, there is shown, the connection interface 400 and the corresponding connector 412 that may comprise the twisted pair terminal pins 440. In addition, there is shown the cable 426 and the connector 420 that may comprise the cable characteristics module 430 and the twisted pair pins 442.

Various aspects of the connection interface 400 may be similar and/or substantially the same as the connection interface 134a described with respect to FIG. 1a and/or as the connection interface 134b described with respect to FIG. 1b, for example. The connection interface 400 may be similar to the connection interface 300, however, rather than communicating via connection interface pins, the connection interface 400 may utilize pins corresponding to twisted pair wires in the cable 426 for communicating with, powering and/or enabling the cable characteristics module 430. The connection interface 400 may be attached to and/or communicatively coupled to a communication device, for example, the communication device 102a and/or 102b. The connection interface 400 may comprise the corresponding connector 412, the connector 420 and/or the cable 426. Various aspects of the corresponding connector 412, the connector 420 and/or the cable 426 may be similar and/or substantially the same as various corresponding aspects of the corresponding connector 112a, the connector 120a and/or the cable 126a respectively, for example. Moreover, various aspects of the corresponding connector 412, the connector 420 and/or the cable 426 may be similar and/or substantially the same as corresponding aspects of the corresponding connector 112b, the connector 120b and/or the cable 126b respectively, for example.

Various aspects of the corresponding connector 412 may be similar and/or substantially the same as various aspects of the corresponding connector 312, however, the corresponding connector 412 may not utilize connection interface pins to communicate with the cable characteristics module 412. Rather, the corresponding connector 412 may communicate via one or more of the twisted pair termination pins 440 and/or the twisted pair pins 442 in the connector 420. In this manner, the communication device 102a that may be coupled to the connection interface 400, for example, may communicate with the cable characteristics module 430, for example, to read various characteristics, features and/or configurations of the connector 420 and/or the cable 426. In an exemplary embodiment of the invention, the corresponding connector 412 may be configured to utilize two or three pins from the twisted pair terminal pins 440 for communicating with the cable characteristics module 330. For example, the pins may be utilized for Vcc, serial communication and/or enabling communication with the cable characteristics module 430; however, the invention is not so limited.

The corresponding connector 412 may be operable to provide an enable signal to the cable characteristics module 430 to communicate various connector and/or cable characteristics via the twisted pair terminal pins 440. For example, the host 104a and/or the host 104b may request and/or initiate an enable signal to be sent to the cable characteristics module 430 in order to read various cable characteristics that may be stored in the module 430. For example, a PHY device, such as the PHY device 116a and/or 116b may generate the enable signal and may communicate the signal to the cable characteristics module 430 via one or more of the twisted pair terminal pins 440 in the corresponding connector 412.

The connector 420 may comprise suitable logic, circuitry, interfaces and/or code that may be operable to store and/or communicate the various characteristics, features and/or configuration of the connector 420 and/or the cable 426 to the corresponding connector 412. The connector 420 may comprise a plurality of twisted pair pins 442. In addition, the connector 420 may comprise the cable characteristics module 430. The cable characteristics module 430 may be configured to provide a serial signal to the corresponding connector 412 via one or more twisted pair pins 442.

The cable characteristics module 430 may be similar and/or substantially the same as the cable characteristics module 330 described with respect to FIG. 3; however the cable characteristics module may communicate with the corresponding connector 412 and/or receive power via one or more of the twisted pair pins 442.

In operation, the connector 420 may comprise a cable characteristics module 430 that may comprise an EEPROM, for example. Various characteristics, features and/or configurations of the connector 420 and/or the cable 426 may be stored in the cable characteristics module 430. The connector 420 may be coupled to the corresponding connector 412 that may be attached to the communication device 102a, for example. At the time of connector-in, a voltage and/or an enable signal may be delivered to the connector 420 and/or to the cable characteristics module 430. For example, the PHY 116a may generate an enable signal and may communicate the enable signal to the cable characteristics module 430 via a pin in the twisted pair terminal pins 440 and a corresponding pin in the twisted pair pins 442 on the connector 420 that may be coupled to the cable characteristics module 430. The cable characteristics module 430 may write various characteristics, features and/or configurations of the connector 420 and/or the cable 426 to the communication device 102a via one or more of the twisted pair pins 442 and/or the twisted pair terminal pins 440 in the corresponding connector 412. In an exemplary embodiment of the invention, a portion of the twisted pair wires utilized for communicating cable characteristics may not be utilized for data communication, for example, when 10BASE-T and/or when 100BASE-TX may be utilized. In other embodiments of the invention, for example, for 1000BASE-T and/or higher rate communication, a portion of the pins utilized for data communication may also be utilized for communicating cable characteristics prior to autonegotiation and/or prior to data communication, for example. In this manner, the communication device 102a may be operable to determine an appropriate communication data rate and/or to perform autonegotiation based on the various cable 426 characteristics, features and/or configurations.

Figure 5:
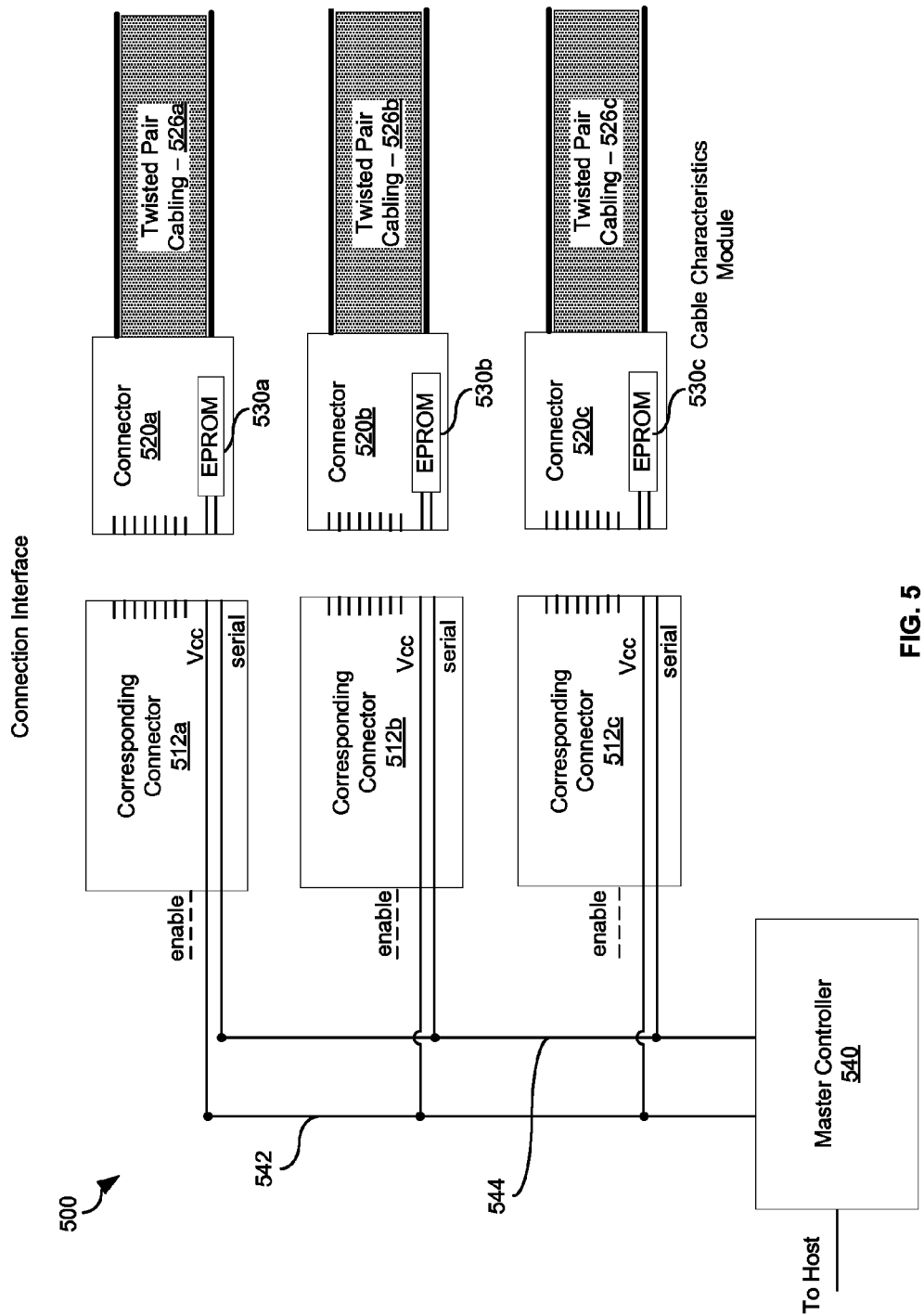
FIG. 5 is a block diagram that illustrates a master controller that is operable to control communication with a plurality of cable characteristics modules within a plurality of connectors, via a bus that is integrated on a local device, in accordance with an embodiment of the invention.

FIG. 5 is a block diagram that illustrates a master controller that is operable to control communication with a plurality of cable characteristics modules within a plurality of connectors, via a bus that is integrated on a local device, in accordance with an embodiment of the invention. Referring to FIG. 5, there is shown, a connection interface 500 that may comprise a plurality of connectors 520a, 520b and 520c, that may comprise the cable characteristics modules 530a, 530b and 530c respectively and a plurality of twisted pair cables 526a, 526b and 526c that may be coupled to the connectors 520a, 520b and 520c respectively. In addition, there is shown a a master controller 540, plurality of corresponding connectors 512a, 512b and 512c, a Vcc line 542 and a serial line 544.

Various aspects of the corresponding connectors 512a, 512b and 512c may be similar and/or substantially the same as various aspects of the corresponding connectors 112a, 112b, 212, 312 and/or 412. The corresponding connectors 512a, 512b and/or 512c may be coupled to the communication device 102a and/or 102b, for example. Furthermore, in various embodiments of the invention, the corresponding connectors 512a, 512b and/or 512c may be ganged together, for example, the corresponding connectors 512a, 512b and 512c may be installed in parallel and/or may be mechanically and/or communicatively coupled. In this regard, two or more of the corresponding connectors 512a, 512b and/or 512c may be modular. Although three corresponding connectors are shown in FIG. 5, the invention is not so limited and may utilize more or less than three corresponding connectors in parallel and similarly configured. The corresponding connectors 512a, 512b and 512c may be referred to as the corresponding connectors 512.

Various aspects of the connectors 520a, 520b and/or 520c may be similar and/or substantially the same as various aspects of the connectors 120a, 120b, 220, 320 and/or 420. The connectors 520a, 520b and/or 520c may be referred to as the connectors 520. Various aspects of the cable characteristics modules 530a, 530b and/or 530c may be similar and/or substantially the same as various aspects of the cable characteristics modules 130a, 130b, 230, 330 and/or 430. The cable characteristics modules 530a, 530b and/or 530c may be referred to as the cable characteristics modules 530. Various aspects of the cables 526a, 526b and/or 526c may be similar and/or substantially the same as various aspects of the cables 126a, 126b, 226, 326 and/or 426. The cables 526a, 526b and/or 526c may be referred to as the cables 526.

The master controller 540 may comprise suitable logic, circuitry, interfaces and/or code that may be operable to control communication with the connection interface 500. For example, the master controller 540, which may be integrated on the communication device 102a and/or 102b, may be communicatively coupled to the corresponding connectors 520. The master controller 540 may communicate with the cable characteristics modules 530 via a serial line 544 and/or a Vcc line 542. For example, communication pins within the corresponding connectors 512 may be communicatively coupled to the serial line 544 and/or the Vcc line 542. The communication pins are described with respect to figures FIG. 2 and FIG. 3. Alternatively, the serial line 544 and/or the Vcc line 542 may be communicatively coupled to one or more twisted pair terminal pins in the corresponding connector 512. The twisted pair terminal pins are described with respect to FIG. 4. In this manner, communication between the communication device 102a and/or 102b and a plurality of connectors 520 and/or cables 526 may be controlled by a single master controller 540.

In operation, when one or more of the connectors 520 and/or the cables 526 are coupled to one or more of the corresponding connectors 512, the cable characteristics modules 530 that are integrated on the connectors 520 may report various characteristics, features and/or configurations that may be stored on the cable characteristics module 530. The communication device 102a and/or the communication device 102b may initiate reading the various characteristics, features and/or configurations of the one or more connectors 520. In this regard, the host 104a, for example, may request that an enable signal be sent to a specified connector 520. The enable signal may be communicated to the appropriate cable characteristics module 530 in any suitable manner. For example, the master controller 540 may be operable to generate the enable signal. In this regard, an additional line to each corresponding connector 512 from the master controller 540 may be utilized to transmit the enable signals. Alternatively, the PHY device 116a and/or the PHY device 116b may send an enable signal via a twisted pair terminal pin as described with respect to FIG. 3 and/or FIG. 4, for example. When one or more of the cable characteristics modules 530 receives an enable signal, characteristics, features and/or configurations that are stored in the cable characteristics modules 530 are communicated to the respective corresponding connectors 512.

Figure 6:
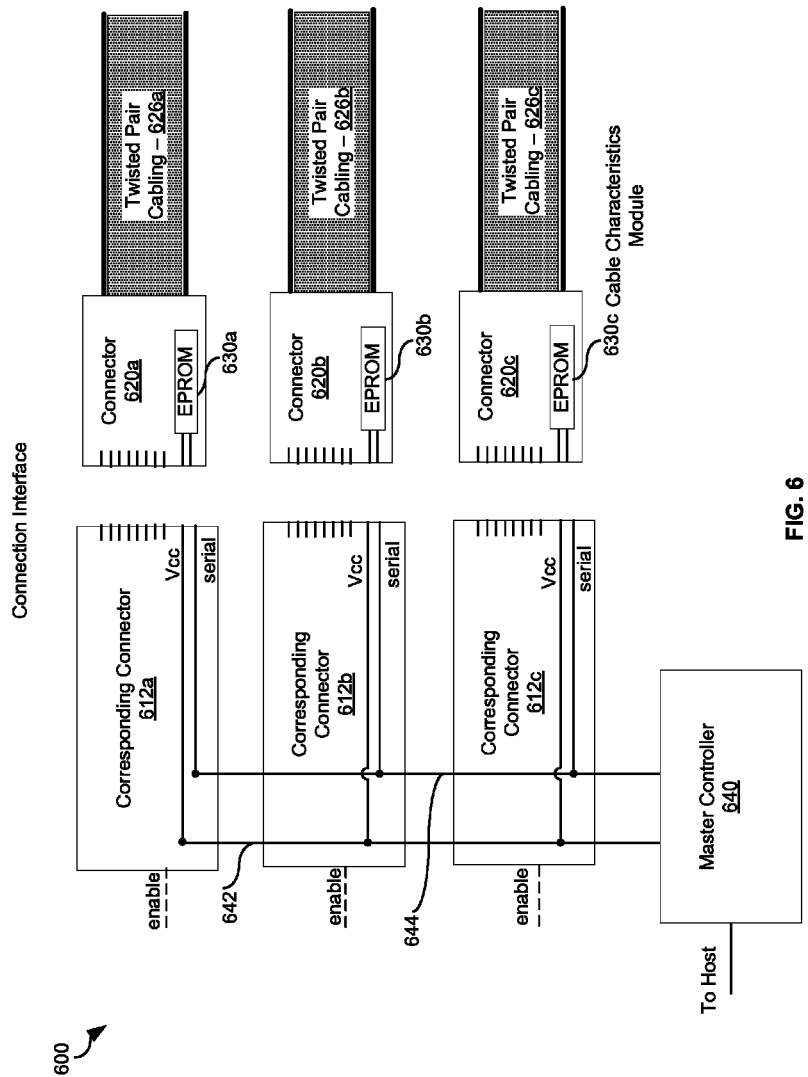
FIG. 6 is a block diagram that illustrates a master controller that is operable to control communication with a plurality of cable characteristics modules within a plurality of connectors via a bus that is integrated among the plurality of connectors, in accordance with an embodiment of the invention.

FIG. 6 is a block diagram that illustrates a master controller that is operable to control communication with a plurality of cable characteristics modules within a plurality of connectors via a bus that is integrated among the plurality of connectors, in accordance with an embodiment of the invention. Referring to FIG. 6, there is shown, a connection interface 600 that may comprise a plurality of connectors 620a, 620b and 620c that may comprise cable characteristics modules 630a, 630b and 630c respectively and a plurality of twisted pair cables 626a, 626b and 626c that may be coupled to the connectors 620a, 620b and 620c respectively. One or more of the connectors 620a, 620b and 620c may be referred to as the connectors 620, one or more of the cable characteristics modules 630a, 630b and 630c may be referred to as the cable characteristics modules 630 and/or one or more of the twisted pair cables 626a, 626b and 626c may be referred to as the twisted pair cables 626. In addition, there is shown a master controller 640, a plurality of corresponding connectors 612a, 612b and 612c that may be referred to as the corresponding connectors 612, a Vcc line 642 and a serial line 644.

Various aspects of the connection interface 600 may be similar to various aspects of the connection interface 500. A primary distinction between the connection interface 500 and the connection interface 600 may comprise connections between the corresponding connectors 620 that enable communication. For example, the corresponding connectors 612 may be ganged together and/or may comprise conductors between the corresponding connectors that enable communication among the corresponding connectors 612. Furthermore, the corresponding connectors may be communicatively coupled to the master controller 640. Two or more of the corresponding connectors 612a, 612b and/or 612c may be modular. Although three corresponding connectors are shown in FIG. 6, the invention is not so limited and may utilize more or less than three corresponding connectors in parallel and similarly configured.

The Vcc line 642 and/or the serial line 644 may be connected through the corresponding connectors 612 rather than integrated on the communication device 102a and/or 102b, for example.

In operation, the master control 640 may similar and/or substantially the same as the operation of the master control 640, however, the communication lines between the master controller 640 to the cable characteristics modules 630 may be integrated within the corresponding connectors 612.

Figure 7:
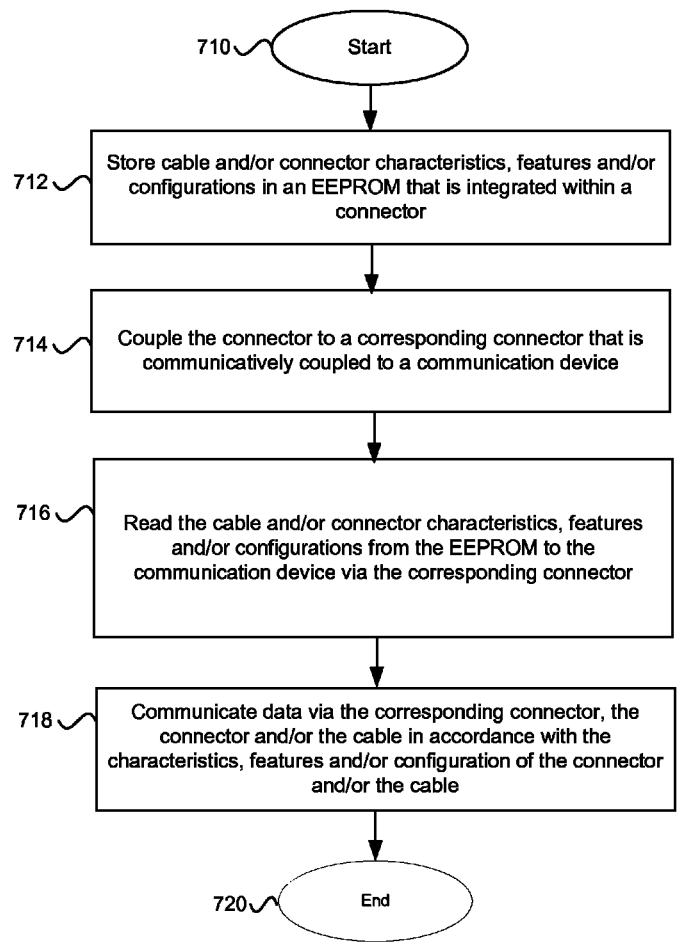
FIG. 7 is a flow chart illustrating exemplary steps for identifying various cable characteristics in a connection interface, in accordance with an embodiment of the invention.

FIG. 7 is a flow chart illustrating exemplary steps for identifying various cable characteristics, features and/or configurations in a connection interface, in accordance with an embodiment of the invention. The exemplary steps may begin with step 710. In step 712, cable 426 and/or the connector 420 characteristics, features and/or configurations may be stored in an EEPROM, for example, the cable characteristics module 430, which is integrated within the connector 420. In step 714, the connector 420 may be coupled to the corresponding connector 412 that is communicatively coupled to the communication device, 102a for example. In step 716, the cable 426 and/or the connector 420 characteristics, features and/or configurations may be read from the EEPROM, for example, the cable characteristics module 430, to the communication device 102a via the corresponding connector 412, for example. In step 718, data may be communicated via the connector corresponding connector 412, the connector 420 and/or the cable 426 in accordance with the characteristics, features and/or configuration of the connector 420 and/or the cable 426. The exemplary steps may end in step 720.

In an embodiment of the invention, a connector, for example, one or more of the connectors 120, 220, 320, 420, 520 and 620 may comprise a storage device, for example, one or more of the cable characteristics modules 330, 430, 530 and 630 and/or the cable characteristics indicator pins 230. The connector may acquire configuration information for the connector from the storage device, for example, from the cable characteristics modules 330. The acquired configuration information may be communicated to a host device for example, to one or more of the communication devices 102a and 102b and/or to the host devices 104a and 104b, to which the connector may be communicatively coupled, via a corresponding connector, for example, via one or more of the corresponding connectors 112, 212, 312, 412, 512 and 612. The connector may also be communicatively coupled to a twisted pair cable, for example, to one or more of the twisted pair cables 126, 226, 326, 426, 526 and 626. The configuration information may comprise one or more of characteristics, features and/or configurations of the connector and/or of a cable that is communicatively coupled to the connector. Moreover, the configuration information may comprise wire gauge, safety information, cable category, verification of testing, inner shielding, outer shielding, no shielding, type of use, and/or country of manufacture. The storage device may comprise an EPROM, for example, one or more of the cable characteristics modules 330, 430, 530 and 630 may comprise and EPROM. The connector may indicate the configuration information of the connector utilizing one or more configured pins within the connector, for example, utilizing the indicator pins 230 that may indicate cable characteristics. The corresponding connector may sense and/or read the configuration information from the connector, for example, utilizing the sense pins 228, the interface communication pins 328 and/or the twisted pair terminal pins 340 or 440. The corresponding connector may be integrated in the host device and may be mechanically ganged and/or communicatively coupled to one or more other connectors that are integrated in the host device, for example, utilizing Vcc line 642 and serial line 644 as shown in FIG. 6. A single controller, for example, the master controller 540 or 640 that may be integrated in the host device may control the acquisition of the configuration information from the storage device in the connector. A data rate for communicating data via the connector and/or via a cable that is communicatively coupled to the connector may be determined based on the configuration information. In this manner, data may be communicated via the connector and/or via the cable, based on one or more characteristics, features and/or configurations that may be stored and/or configured within the connector.

In another embodiment of the invention, one or more connection interfaces, for example, one or more of the connection interfaces 134a, 134b, 200, 300, 400, 500 and/or 600, may sense and/or read from a connector 320 and/or a cable 326, for example, one or more characteristics, features and/or configurations of the connector 320 and/or the cable 326. The one or more characteristics, features and/or configurations of the connector 320 and/or the cable 326 may be referred to as characteristics. In this regard, the one or more characteristics may be stored and/or configured within the connector 320, for example. The one or more characteristics may comprise one or more of wire gauge, safety information, cable category, verification of testing, inner shielding, outer shielding, no shielding, type of use, and/or country of manufacture. The corresponding connector 320, for example, in the one or more connection interfaces 300, may sense and/or read the one or more characteristics. In an exemplary embodiment of the invention, the one or more characteristics may be stored in an EPROM, for example, in the cable characteristics module 330 within the connector 320. In other exemplary embodiments of the invention, the one or more characteristics may be represented by and/or communicated via one or more configured pins, for example, the cable characteristics indicator pins 230 within the connector 220, as described with respect to FIG. 2, for example.

The one or more connection interfaces 134a, 134b, 200, 300, 400, 500 and/or 600, for example may comprise one or more corresponding connectors 112a, 112b, 212, 312, 412, 512 and/or 612, for example, one or more connectors 120a, 120b, 220, 320, 420, 502 and/or 620 and/or one or more cables 126a, 126b, 226, 326, 426, 526 and/or 626, for example. The cables 126a, 126b, 226, 326, 426, 526 and/or 626 may comprise twisted pair cable. Furthermore, the one or more connection interfaces 134a, 134b, 200, 300, 400, 500 and/or 600 may be controlled by a single master controller 540 and/or 640, for example.

A data rate for communicating via the connector 320 and/or the cable 326, for example, may be determined and/or auto-negotiated based on the one or more characteristics, features and/or configurations of the connector 320 and/or the cable 326. In this manner, data may be communicated via the connector 320 and/or the cable 326 based on the one or more characteristics, features and/or configurations of the connector 320 and/or the cable 326 that may be stored and/or configured within the connector 320.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for determining characteristics of an attached Ethernet connector and/or cable.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
in a connector comprising a storage device and a media access control (MAC) controller:
performing MAC functions;
acquiring from said storage device within said connector, configuration information of said connector; and
communicating said acquired configuration information to a host device to which said connector is communicatively coupled via a corresponding connector, wherein one or both of:
said acquired configuration information is read from said storage device in said connector via one or more twisted pair pins of said connector; and
said reading of said acquired configuration information is enabled by a signal delivered to said storage device via one or more twisted pair pins of said connector.

2. The method according to claim 1, wherein said connector is communicatively coupled to a twisted pair cable.

3. The method according to claim 1, wherein said configuration information comprises one or more of characteristics, features or configurations of said connector or of a cable that is communicatively coupled to said connector.

4. The method according to claim 1, wherein said configuration information comprises one or more of wire gauge, cable category, verification of testing, type of use, or country of manufacture.

5. The method according to claim 1, wherein one or both of:
said storage device comprises an EPROM
said configuration information of said connector is indicated utilizing one or more configured pins within said connector.

6. The method according to claim 1, wherein said corresponding connector senses or reads said configuration information from said connector.

7. The method according to claim 1, wherein said corresponding connector is integrated in said host device and is mechanically ganged or communicatively coupled to one or more other connectors that are integrated in said host device.

8. The method according to claim 1, wherein said acquiring from said storage device within said connector, configuration information of said connector, is controlled by a single controller that is integrated in said host device.

9. The method according to claim 1, wherein a data rate for communicating data via said connector or via a cable that is communicatively coupled to said connector, is determined based on said configuration information.

10. A system for communication, the system comprising:
one or more processors or circuits for use within a connector, wherein said one or more processors or circuits comprise a storage device and a media access control (MAC) controller within said connector; and wherein said one or more processors or circuits are operable to:
perform MAC functions;
acquire from said storage device within said connector, configuration information of said connector; and
communicate said acquired configuration information to a host device to which said connector is communicatively coupled via a corresponding connector, wherein one or both of:
said acquired configuration information is read from said storage device in said connector via one or more twisted pair pins of said connector; and
said reading of said acquired configuration information is enabled by a signal delivered to said storage device via one or more twisted pair pins of said connector.

11. The system according to claim 10, wherein said connector is communicatively coupled to a twisted pair cable.

12. The system according to claim 10, wherein said configuration information comprises one or more of characteristics, features or configurations of said connector or of a cable that is communicatively coupled to said connector.

13. The system according to claim 10, wherein said configuration information comprises one or more of wire gauge, cable category, verification of testing, type of use, or country of manufacture.

14. The system according to claim 10, wherein said storage device comprises an EPROM.

15. The system according to claim 10, wherein said one or more processors or circuits are operable to indicate said configuration information of said connector utilizing one or more configured pins within said connector.

16. The system according to claim 10, wherein said corresponding connector senses or reads said configuration information from said connector.

17. The system according to claim 10, wherein said corresponding connector is integrated in said host device and is mechanically ganged or communicatively coupled to one or more other connectors that are integrated in said host device.

18. The system according to claim 10, wherein said acquiring from said storage device within said connector, configuration information of said connector, is controlled by a single controller that is integrated in said host device.

19. The system according to claim 10, wherein a data rate for communicating data via said connector or via a cable that is communicatively coupled to said connector, is determined based on said configuration information.

* * * * *